United States Patent [19]

Ramirez

[11] Patent Number: 4,603,744

[45] Date of Patent: Aug. 5, 1986

[54] WEED EXTRACTOR DEVICE

[76] Inventor: Frank L. Ramirez, 1109 S. Lark Ellen, West Covina, Calif. 91791

[21] Appl. No.: 667,146

[22] Filed: Nov. 1, 1984

[51] Int. Cl.$^4$ ............................................... A01B 1/16
[52] U.S. Cl. .......................................... 172/25; 294/50
[58] Field of Search ............... 172/25, 378; 294/50, 294/61, 49, 55.5

[56] References Cited

U.S. PATENT DOCUMENTS

| | | | |
|---|---|---|---|
| 643,165 | 2/1900 | Schumacher | 172/25 |
| 858,429 | 7/1907 | Webb | 294/50 |
| 944,393 | 12/1909 | Whitney | 294/51 X |
| 2,030,770 | 2/1936 | Smith | 172/22 |
| 2,521,032 | 9/1950 | Becker | 294/50 |
| 3,198,719 | 8/1965 | Stewart | 172/378 X |
| 3,847,227 | 11/1974 | Myers | 172/22 |
| 4,326,743 | 4/1982 | Tamura | 294/55.2 |

Primary Examiner—Richard J. Johnson
Attorney, Agent, or Firm—Boniard I. Brown

[57] ABSTRACT

A weed extractor device has an elongated member with a crank at its upper end portion and an extractor head at its lower end portion, the head having at least one blade, and preferably two, for insertion and rotation in soil. The blades have leading edge portions adapted for movement through soil and preferably define teeth adapted to facilitate movement and to retain weeds wrapped about the head. A weed ejector may be provided and has an ejector plate on a rod slidable relative to the elongated member for manual operation to eject weeds wound about the head.

11 Claims, 7 Drawing Figures

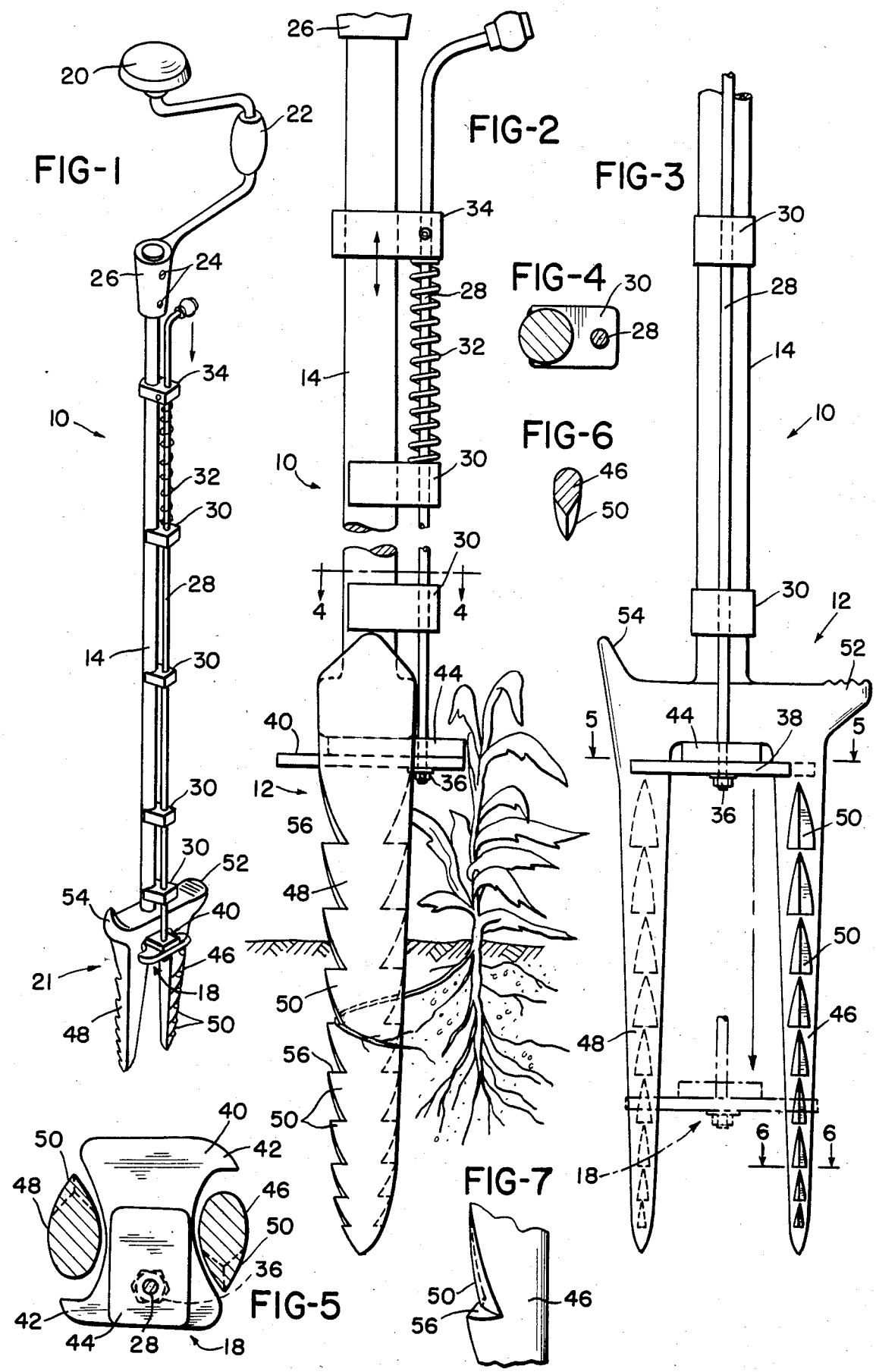

WEED EXTRACTOR DEVICE

BACKGROUND OF THE INVENTION

Devices of the prior art for use in extracting weeds and other vegetation from soil, have involved certain shortcomings and disadvantages. Many of these require slow, tedious uses of a device to remove one weed or plant at a time. Most devices provide no means for picking up or removing a weed or plant after it is removed from the soil, and this must be done manually. Most prior devices require the operator or person using the device to bend over, kneel or squat in order to employ the device in weed or plant extraction from the soil. Use of prior devices involves other shortcomings.

There has therefore existed a need for a weed extractor apparatus which will alleviate or eliminate these and other shortcomings and problems of prior devices.

The objects and purposes of the weed extractor apparatus of the present invention include the rapid, efficient removal of weeds, weed roots and other vegetation from soil, the collection of a quantity of extracted weeds and vegetation on the apparatus during its operation to remove the same from the soil, the quick and convenient removal of collections of vegetation from the apparatus, and the capability of being utilized while the operator is in a standing position without requiring the operator to bend, squat of kneel. The latter is an important advantage for persons for whom bending, kneeling or squatting is difficult, such as elderly persons, persons afflicted with arthritis or other ailments, etc.

SUMMARY OF THE INVENTION

The aforementioned objects and advantages, as well as other advantages which will become apparent from the description of the preferred embodiment, are attained by a weed extractor device which includes an elongated member having a crank at its upper end portion for manual rotation and an extractor head on its lower end portion. The extractor head has at least one blade, and typically two blades, adapted to be inserted into the soil and to be rotated therethrough to engage the roots of weeds and vegetation and to wrap the same about the head. The blades have leading edge portions adapted for movement through the soil and preferably provided with a plurality of teeth adapted to retain on the blades weeds, weed roots and other vegetation which become wrapped about the head during rotation of the head in the soil. A weed ejector assembly of the device has an ejector plate positioned between the blades, the ejector plate mounted on a rod which is slidably mounted on the elongated member for manual operation of the ejector plate to eject weeds wound about the head. The ejector rod is slidably mounted in brace members secured to the elongated member. The ejector assembly is normally maintained in an upward or retracted position by means of a spring which is arranged to exert resilient upward force on the ejector assembly.

BRIEF DESCRIPTION OF THE DRAWING

FIG. 1 is a perspective view of a preferred embodiment of the extractor device of the present invention;

FIG. 2 is a partial elevational view of the embodiment of FIG. s;

FIG. 3 is an enlarged partial view of a portion of the device of FIGS. 1 and 2;

FIG. 4 is a sectional view taken at line 4—4 in FIG. 2;

FIG. 5 is a sectional view taken at line 5—5 in FIG. 3; and

FIG. 6 is a sectional view taken at line 6—6 in FIG. 3

FIG. 7 is a fragmentary perspective view of a tooth on the blade portion of the tool of FIGS. 1-6.

DESCRIPTION OF THE PREFERRED EMBODIMENT

Referring to the drawing, a preferred embodiment of the weed extractor device 10 of the invention is shown as comprising an extractor head 12, an elongated bar 14, a crank 16 on the upper end portion of bar 14, and a weed ejector or discharge assembly 18.

A knob 20 is rotatably mounted at the outer end of crank 16, and a handle 22 is rotatably mounted on an offset portion of the crank which is secured to the upper end portion of bar 14 by welding or by threaded fasteners 24, as shown.

The weed ejector or discharge assembly 18 includes a rod 28 slidably mounted in openings in brackets 30 which are secured, as by welding, in spaced relation along bar 14. A return spring 32 extends between a bracket 30 and a guide element 34, similar in configuration to bracket 30, which is slidably mounted on the rod 28. A discharge plate 38 is normally urged by spring 32 into its upward retracted position shown in the drawing.

The ejector plate 38 is secured to a threaded lower end portion rod 28 by a nut 36 and an associated washer, as shown in FIGS. 2 & 3. An outwardly extending portion 40 of the ejector plate is adapted to receive the foot of a user for application of force for removal of weeds wrapped about the head 12, when necessary. A magnet 44 is positioned atop the ejector plate, both the ejector plate and the magnet being configurated and adapted to fit between blades 46, 48, as indicated in FIGS. 1 and 3. Upwardly extending hook portions 42 are adapted to engage weed roots and other vegetation upon rotation of the weed extractor and to retain the vegetation and weeds on the head 12.

Extractor head 12 includes blades 46, 48 which are spaced apart as shown. On each of the blades is defined a plurality of teeth or hook portions 50, which increase in size from the lower end portions to the upper end portions of the blade, as shown in FIG. 3, which are disposed on the leading edge of each blade as the head 12 is rotated through soil, thus to engage vegetation and retain the same wound about the head, upwardly facing tooth faces 56 facilitating such engagement and retention. An extension portion 52 is provided on the head to receive the foot of an operator for insertion of downward force to urge the ejector head 12 into the soil, if necessary, although this is ordinarily not required. A hook portion 54 serves such auxiliary uses or purposes as the engagement of dead limbs or branches or trees, etc., by extending the apparatus of the invention upwardly for engagement and removal of the same.

In the operation and utilization of the extractor device of the invention, the blades 46, 48 are inserted into the soil by manual exertion on knob 20 and handle 22 on the upper portion of the device and/or by application of the foot of the user on portion 52 of the head, and the device is rotated by means of crank 16 clockwise as viewed in FIGS. 5 and 1, one hand of the user grasping the knob 20 and the other hand rotating the device by means of handle 22. This action and movement of the device wraps roots and entire weeds about the blades or prongs 46 and 48, the teeth or serrations 50 serving to retain the weeds on the extractor head. In soft, dry ground the prongs or blades may typically be inserted into the ground about an inch deep, thus to wind surface weeds about the head by rotating the device. A plurality of weeds is wrapped in succession about the head.

Both of the blades or prongs cut through the soil during rotation of the device, the leading edges of the prongs or blades 46, 48 and the teeth 50 being relatively sharp and streamlined for this purpose. Rotation of the device engages, hooks and brings to the surface the roots of the weeds. The device may be inserted into the soil to an appropriate depth, depending upon the depth of weed roots.

Relatively large quantities or bundles of weeds may become wrapped about the prongs or blades and be retained thereon by the teeth or serrations 50.

The collection of weeds wound about the head is ordinarily removed from the extractor head by urging downwardly the discharge assembly 18 by exertion of manual force on the handle at the upper end of ejector rod 28 to eject and remove weeds wound about head 12.

Large bundles or wrappings or weeds must be manually removed when the downward urging of the discharge assembly 18 and discharge plate 38 is not effective to remove the same. Typically, the operator uses a gloved hand directly on the wrapped weeds or applies his foot to the outwardly extending portion of discharge plate 38 to remove large collections of weeds from the extractor head.

It will be understood that wetting of the soil from which weeds are to be removed by the extractor device of the invention, serves to facilitate removal of weeds by the device of the invention. It will also be understood that an operator, utilizing the device of the invention, may typically deposit or dump weeds removed by the ejector device of the invention at a convenient location for the drying of the same before they are disposed in an appropriate refuse container, etc.

The extractor device of the invention may typically be 48" long and have a weight of less than three pounds.

Utilizing the device of the invention, with only limited experience, a person can extract and gather weeds in a rapid and efficient manner, in comparison with prior devices and methods of removal of weeds. The device provides substantially more rapid and effective operation in weed removal than conventional manually operated hand tools. The operator, while in a standing position, merely positions the device in the soil, from any of a wide range of angles and positions. It is more effective to attack roots by pushing the device into the ground from above, instead of at a relatively small angle to the horizontal.

The operator operates the device while in a standing position, and seldom is required to bend down or kneel. This is an important and desirable advantage for persons for whom such bending or kneeling is difficult, such as persons afflicted with arthritis or other ailments, persons of advanced age, etc., who can operate the device of the invention without any substantial problem.

The device of the invention facilitates and makes easier the removal of weeds from rocky plant or flower beds. The device can be extended under bushes and other objects for weed removal by inclining the device at an appropriate angle without the operator kneeling, bending down or squatting, and without the operator getting dirty. The operator need not get any closer than four feet utilizing the device, which may typically be 48" long.

The configuration of the device and its extractor head enable it to be utilized for other or auxiliary purposes. These include utilizing the forked configuration of the extractor head for turning on and off sprinkler valves. The device may be utilized for digging and providing holes for fertilizing and aerating soil. The device may also be useful in picking up and removing refuse, such as papers, leaves, etc. It may also be utilized in capturing and trapping snakes utilizing the forked configuration of the extractor head, and the winding of the device utilizing the crank.

Thus there has been shown and described a novel weed extractor device which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. A multi-purpose tool and vegetation extractor, comprising:
   an elongated shank having upper and lower end portions,
   crank means on the upper end portion of the shank for manual rotation of the tool,
   a pair of spaced blades extending longitudinally from the lower end portion of the shank, said blades defining generally wedge-shaped edge portions streamlined in the direction of said rotation to facilitate movement through soil upon said rotation of the tool, each of said blades having a reduced lower end portion for insertion into soil, each of the blades also having a plurality of teeth defined at the leading edges of the blades, at least certain ones of said teeth having upwardly facing tooth faces to engage and retain vegetation wrapped about the blades during said rotation.

2. A weed extractor device according to claim 1, and further including:
   a weed ejector assembly including an ejector plate disposed between the blades, and
   a rod carrying the ejector plate on its end portion, said rod being slidably mounted relative to said elongated member for manual operation to eject weeds wound about said head.

3. A weed extractor device according to claim 2, wherein:
   said ejector rod is slidably mounted in a plurality of brace members on the elongated member.

4. A weed extractor device according to claim 2, wherein:
   said ejector assembly is normally retained in an upward retracted position by spring means adapted and arranged to exert resilient upward force on the ejector assembly relative to said elongated member.

5. A tool according to claim 1, and further including:

a knob on said crank means, said knob having a generally flat upper face for application of force for insertion of the blades of the tool into soil.

6. A weed extractor device according to claim 5, and further including:
a weed ejector assembly including an ejector plate disposed between the blades, and
a rod carrying the ejector plate on its end portion, said rod being slidably mounted relative to said elongated member for manual operation to eject weeds wound about said head.

7. A weed extractor device according to claim 6, wherein:
said ejector rod is slidably mounted in a plurality of brace members on the elongated member.

8. A weed extractor device according to claim 6, wherein:
said ejector assembly is normally retained in an upward retracted position by spring means adapted and arranged to exert resilient upward force on the ejector assembly relative to said elongated member.

9. A tool according to claim 1, and further including:
an extractor head which is bifurcated to define said spaced blades.

10. A tool according to claim 1, wherein:
at least certain ones of said teeth are tapered outwardly toward the outer lower ends of said blades.

11. A tool according to claim 1, wherein: each of said blade end portions has a generally tapering and generally pointed lower end portion for insertion into soil.

* * * * *